United States Patent Office 3,611,669
Patented Oct. 12, 1971

3,611,669
METHOD OF SHRINK PACKAGING USING CHLORINATED POLYBUTENE-1 FILM
Thomas Hugh Shepherd, Hopewell, N.J., assignor to Princeton Chemical Research, Inc., Princeton, N.J.
No Drawing. Original application Feb. 26, 1965, Ser. No. 435,688. Divided and this application July 11, 1968, Ser. No. 743,969
Int. Cl. B29c *13/00;* B65b *43/00*
U.S. Cl. 53—30
7 Claims

ABSTRACT OF THE DISCLOSURE

Chlorinated polybutene-1 film having 26–40% chlorine which has an elastic memory such that upon elongation to below the elastic limit and cooling while retaining such elongation, followed by heating to such elevated temperatures under conditions such that the film is not under restraint, the film shrinks to its original size. The chlorinated polybutene-1 film may be in foam form.

---

This application is a division of application Ser. No. 435,688 filed Feb. 26, 1965, now abandoned.

This division application is filed as a result of the restriction requirement made in the parent application on June 22, 1967, which restriction requirement was traversed in the amendment filed in the Patent Office Sept. 18, 1967, bearing a typed date of Sept 15, 1967.

This invention relates to a thermoplastic material having novel tensile and elastic memory properties. More specifically, the invention relates to chlorinated polybutene-1 which is utilized in shrinkable packaging film, rigid packaging and shrinkable/expandable thermoplastic foams.

Although a wide variety of polybutene-1 polymers have outstanding tensile and other physical properties, methods of modification and upgrading these polymers are constantly being sought. Modified polymers can usually be used in new applications, such as foams, packaging film and many others. As an example, in recent years shrinkable clear packaging film has found wide acceptance. The polymers from which the films are made have what is known in the art as "elastic memory," which is that property of the polymer that causes it to return to its original configuration upon being heated, after warming, stretching and cooling. The usual method for conferring such a property on thermoplastic film such as polyethylene is by cross-linking the film by radiation treatment. Polymers also having higher tensile properties are more suitable in applications where tensile strength is critical.

Commercially available elastic memory packaging films require temperatures over 200° F. to obtain shrinkage at reasonable rates. Temperatures of this order are unsuitable for packaging products that are relatively heat-sensitive, such as food items and other heat-perishable products.

One object of this invention is to provide a thermoplastic material having elastic memory properties that is suitable for the manufacture of shrinkable foams or films at temperatures substantailly lower than 200° F. Another object of this invention is to provide a thermoplastic material having high tensile properties. Another object of this invention is to provide a polybutene-1 polymer modified by chlorine sufficient to impart elastic memory and high tensile properties thereto and methods for making such a polymer.

In accordance with these and other objects of this invention, a chlorinated polybutene-1 thermoplastic polymer containing from 26 to 40 percent, and preferably from 30 to 36 percent chlorine, has been discovered, which is a strong, rigid plastic material at ambient temperatures, but becomes soft and elastomic when warmed to 50 to 65° C. Polymers containing less than 26 percent chlorine are soft and have poor dimensional stability at ambient temperatures, whereas polymers containing over 40 percent chlorine are difficult to process and have comparatively lower thermal stability. An article formed from the chlorinated plastic can be deformed or stretched to 3 to 4 times its original dimensions when warmed. The article retains its distorted configuration indefinitely, if cooled from 20 to 30° C., while in this stretched or deformed state. If, however, the article is warmed to 50 to 65° C., it returns rapidly and with force to its original configuration and dimensions. This warming temperature, however, may vary from 50 to 100° C. The chlorinated polybutene-1 is shaped by processes well known in the art, such as extruding, calendering, solvent casting, or foaming.

Chlorination of polybutene-1 is effected with gaseous chlorine bubbled through a solution of the polymer although other methods of chlorination, well known in the art, may be used. Suitable solvents for the chlorination include tetrachloroethylene, hexachloroethane, carbon tetrachloride, chloroform, trichloroethylene, monochlorobenzene, dichlorobenzene and trichlorobenzene. The chlorination is catalyzed by ultra-violet light (U.V.) or by various peroxides, such as benzoyl peroxide, dicumyl peroxide, ditertiary butyl peroxide, cumene hydroperoxide, methyl ethyl ketone peroxide, tertiary butyl hydroperoxide, or any combination thereof. The concentration of polymer in the chlorination solvent ranges from 5 to 15 percent by weight per volume depending on the molecular weight of the polymer. It is desirable to use as high a concentration of polymer as possible without exceeding a workable solution viscosity. Chlorination is carried out at temperatures between 35° C. and the boiling point of the solvent. Generally, temperatures above 50° C. are preferable. The chlorinated polymer may be recovered from the chlorination solvent by various means including solvent evaporation and/or precipitation by means of a non-solvent.

Polybutene-1 suitable for chlorination has a melt index, as determined by the American Society for Testing Materials method ASTM D–1238–57, above 0.1, and preferably above 0.5, or in the range from 0.1 to 60.

Materials having lower melt indices are difficult to process after chlorination. Polybutene-1 containing 0–100 percent isotactic polymer is suitable for chlorination, since isotacticity does not affect the mechanical properties of the chlorinated polymer. This isotacticity is expressed in terms of percent diethyl ether insolubility and can vary from 0 percent to 100 percent.

Stabilizers may be incorporated in the polybutene-1 to allow processing at elevated temperatures without degradation or discoloration of the polymer. Stabilizers generally suitable for use with polyvinyl chloride may be incorporated in the chlorinated polybutene-1 and include organo-tin compounds, barium, calcium and lead salts, epoxidized organic materials, such as epoxy resins and epoxidized fats and oils, or any combination thereof. The quantity of stabilizer incorporated varies with the stabilizing effect of the compound used and the processing conditions under which fabrication is carried out. In general, the quantity of stabilizer required for adequate protection is less than 5 phr., where "phr." by definition will mean parts by weight per 100 parts by weight of resin.

The chlorinated polybutene-1 in one embodiment of this invention is converted to shrinkable packaging film by tubular extrusion at die temperatures of 250 to 380° F. The extruded tube is then cooled to 140 to 190° F. and is simultaneously stretched, and/or expanded with air pressure, after which it is cooled. Alternately, a film may be produced that will shrink predominantly in one direction by either stretching the film longitudinally or expanding the tube with air. The extruded tube is stretched to about 3 to 4 times its original dimensions in either one or more than one direction. The degree of shrinkage obtained with the chlorinated polybutene-1 is controlled by the amount of expansion applied to the warm extruded tube. Articles thus produced may have a thickness from 0.5 to 25 mils.

Shrinkable packaging materials formed from chlorinated polybutene-1 have considerable advantages over commercially available shrink films for packaging of heat-sensitive materials, such as meat, fruit, and vegetables, since rapid shrinkage is obtained at moderate temperatures, e.g., 140° F. Other shrink films require temperatures over 200° F. to obtain shrinkage at reasonable rates.

The shrinkage force, or recovery stress of chlorinated polybutene-1 varies with the degree of expansion of the chlorinated polymer and the temperature used to promote shrinking. A sample stretched to 3 times its original length exhibited a maximum shrinkage force of 960 p.s.i. at 45° C. This force is only 200 p.s.i. however, at 75° C.

Chlorinated polybutene-1 expanded tubes are useful for packaging toothpaste, creams, soaps, cosmetics and pharmaceuticals. These tubes, upon being warmed, will contract as the contents are used, thereby preventing the entrance of air into the package. Packages conforming to some desired contour which would not ordinarily permit introduction of the contents are molded from chlorinated polybutene-1. The package is then expanded and the contents introduced, after which the package is warmed, whereupon it rapidly returns to its original dimensions.

This invention also relates to chlorinated polybutene-1 foam. Chlorinated polybutene-1 is converted to a cell-like structure at temperatures above 105° C. to provide a low-density foam. The foam is then compressed at temperatures of from 45 to 70° C. and cooled to provide a high-density foam material. Upon rewarming to temperatures ranging from 45 to 70° C., the high-density foam material will expand to its original low-density state. Suitable blowing agents for manufacturing the foam include low boiling solvents, such as methylene chloride, acetone, and methyl ethyl ketone, as well as azobisformamide; azobisisobutyronitrile; N,N'-dinitrosopentamethylenetetramine; benzene-1, 3-disulfonyl hydrazide; diphenyl-sulfone-3, 3'-disulfonyl hydrazide; 4,4'-oxybis (benzenesulfonyl hydrazide), N,N'-dimethyl- N,N'-dinitrosoterephthalamide, or mixtures thereof. Foaming can also be effected by extruding the plastic with pressurized nitrogen, carbon dioxide or other suitable inert gases, or various mixtures thereof.

The foamed polymer may be used for standard and expandable packaging applications, as well as in shock absorbing, heat insulating and sound deadening applications.

The chlorinated polybutene-1, in addition to the stabilizers mentioned previously, may also contain U.V. stabilizers, plasticizers, antioxidants, and the like.

The following non-limiting examples are given as certain preferred embodiments of the invention, and are not to be construed as narrowing the novel and inventive composition, method and article of manufacture herein.

EXAMPLE I

Two-hundred grams of polybutene-1 having 90 percent diethyl ether insolubility and a melt index of 3.7, as measured by the American Society of Testing Materials procedure ASTM D-1238-57, is introduced into a 3-liter flask equipped with a stirrer, Dry Ice condenser and chlorine gas inlet an dexit tubes. Two and one half liters of carbon tetrachloride are added and the mixture heated to 70° C. with stirring to dissolve the polymer. One gram of benzoyl peroxide is added to the solution and gaseous chlorine introduced at a rate of 30 g./hr. for 9 hours. The polymer is precipitated in methanol and dried to constant weight. White polymer granules weighing 309 g. and having a chlorine content of 36 weight percent are obtained.

EXAMPLES II–VI

The procedure of Example I is repeated employing varying reaction times to provide compositions having different chlorine contents. Clear films, 10 mils thick, are formed by compression molding at 300° F. The tensile and other properties of the films at 73° F. are listed in Table I.

TABLE I

| Example | Percent chlorine | Tensile strength, p.s.i. | Yield point, p.s.i. | Tensile modulus, p.s.i. | Percent E |
|---|---|---|---|---|---|
| II | 36 | 6,825 | 5,350 | 224,000 | 160 |
| III | 33 | 3,900 | 2,900 | 180,000 | 173 |
| IV | 30 | 3,260 | 1,362 | 75,000 | 381 |
| V | 27 | 3,060 | 725 | 29,100 | 475 |
| VI | 24 | 2,280 | 316 | 1,050 | 715 |

The expression "Percent E" used in Table I relates to "elongation" at rupture. Also, the yield point in Table I is that point at which the elastic limit is exceeded.

The above data indicate that, as the chlorine content is increased from 24 to 27 percent, the room temperature properties of the polymer change from an elastomeric material having low modules, to a rigid thermoplastic having high tensile strength, and tensile modulus.

EXAMPLE VII

A sample of chlorinated polybutene-1 prepared as in Example I, is compression molded to a thickness of 15 mils at 325° F. A strip, one inch wide and four inches long, is then prepared. The strip is warmed in water at 65° C., stretched to 12 inches in length and cooled to room temperature. Upon re-warming to 65° C., the strip returns rapidly to its original dimensions. This cycle is repeated ten times. No change in dimension of the orignal configuration occurs. The strip is warmed again to 65° C. in hot water and is twisted six revolutions and cooled to provide a helical-like configuration. Upon rewarming in the 65° C. bath, the material returns rapidly to its original flat configuration.

EXAMPLES VIII–XII

Chlorinated polybutene-1 having various chlorine contents, and prepared as in the method of Example I, is molded into 30-mil thick pieces. Six-inch by one-half-inch strips are cut from the molded pieces and heated to 70° C., after which they are stretched in the long direction to 12 inches in length and then cooled to 24° C. The strips are allowed to stand at 23–26° C., and dimensional changes are recorded over a period of from 5 minutes to 1,000 hours. The results are shown in Table II below.

TABLE II

| Ex. | Percent chlorine | Length in inches vs. time | | | | | |
|---|---|---|---|---|---|---|---|
| | | 0 | 5 min. | 1 hr. | 10 hrs. | 100 hrs. | 1,000 hrs. |
| VIII | 24 | 12.0 | 9.0 | 7.0 | 6.3 | 5.8 | 5.8 |
| IX | 27 | 12.0 | 12.0 | 12.0 | 12.0 | 11.8 | 10.5 |
| X | 30 | 12.0 | 12.0 | 12.0 | 12.0 | 11.9 | 11.8 |
| XI | 33 | 12.0 | 12.0 | 12.0 | 12.0 | 12.0 | 12.0 |
| XII | 36 | 12.0 | 12.0 | 12.0 | 11.8 | 11.2 | 10.6 |

After 1,000 hours, the samples are placed in water and heated at 65° C. All strips return rapidly to their original dimensions. It may be seen from the above table that samples containing over 27 percent chlorine, exhibit good dimensional stability when stretched and cooled; additionally, the stability of the deformed strip is related to the chlorine content and, as indicated by the data in Table II, the stability goes through a maximum where the chlorine content of the polybutene-1 comprises approximately 33 percent by weight.

EXAMPLE XIII

A strip of chlorinated polybutene-1, prepared as in Examples I and II, containing 36 percent chlorine, is warmed to 70° C., stretched to three times its original length and cooled. The strip is mounted in the jaws of a tensile testing machine and the shrinkage or recovery stress is recorded as the temperature is increased. The results are listed in Table III.

TABLE III

| Temp.: ° C: | Recovery stress p.s.i. |
| --- | --- |
| 25 | 0 |
| 30 | 80 |
| 35 | 600 |
| 40 | 800 |
| 45 | 960 |
| 50 | 800 |
| 55 | 600 |
| 65 | 320 |
| 75 | 200 |

The above data indicate that the recovery stress goes through a maximum at 45° C.

EXAMPLE XIV

Example I is repeated, however, using polybutene-1 having a melt index of 3.7 (ASTM D–1238–57) and 53 percent diethyl ether insolubility. A chlorinated polymer containing 34 percent chlorine was obtained. The mechanical and elastic memory properties of this polymer are equivalent to those of the chlorinated polybutene-1 prepared from polybutene-1 having a melt index of 3.7 (ASTM D–1238–57) and 90 percent diethyl ether insolubility.

EXAMPLE XV

Chlorinated polybutene-1 containing 34 percent chlorine, prepared from polybutene-1 having a melt index of 6.3 (ASTM D–1238–57) is compounded with 2.0 phr. Thermolite-20, an organo-tin stabilizer, manufactured by Metal and Thermit, Inc. The polymer is compounded on a two-roll mill at 220° F. The material is then granulated and extruded at 340° F. to provide a tube, approximately one inch in diameter, having a wall thickness of 10 mils. The tube is cooled to 170° F. and passed through a nip roll. A bubble is then introduced into the tube by means of air pressure, and the tube passed through a second, chilled nip roll turning at a rate twice the speed of the first nip roll. A tubular article is obtained having a diameter of 3.2 inches and a thickness of 3.0 mils. A section of this tubular article, 6 inches in length, shrinks rapidly to a tube having a diameter of 1 inch and a length of 3 inches, when placed in water at 65° C.

EXAMPLE XVI

A section of the tubular film prepared in Example XV, is sealed around an irregular object having roughly the dimensions of 6″ x 2″ x 2″. A pin hole is placed in one seal to allow escape of air. The sealed envelope is warmed to 70° C. with an infrared lamp. The film shrinks to form a tight form-fitting package.

EXAMPLE XVII

Chlorinated polybutene-1 containing 33 percent chlorine is compounded with 2.0 phr. of Thermolite-20 and 4.0 phr. of azobisformamide on a two-roll mill at 220° F. The mill sheet is removed and placed in an oven at 320° F. for ten minutes. The sheet is removed and cooled to room temperature. A foam, having an apparent density of 18 pounds per cubic foot, is obtained. A section of foam is warmed to 65° C., compressed and cooled. Foam having an apparent density of 58 pounds per cubic foot is obtained. Upon warming the compressed foam to 60° C., it rapidly expanded to a foam having an apparent density of 20 pounds per cubic foot. The heating temperature for developing elastic memory properties, however, varies from 60° to 90° C., whereas the cooling temperatures suitable cover a range from 20° to 30° C. The foam is also compressible to from 1.5 to 5 times its original density.

Thus, there has been described a novel thermoplastic chlorinated polybutene-1 material which is useful for a variety of applications including shrinkable packaging film, rigid and flexible packaging materials, such as films and sheets and expandable foam.

The chlorinated polybutene-1 may be heated from 55° C. to 100° C., stretched and then cooled to below 55° C. to develop elastic memory properties. Heating temperatures ranging from 60 to 90° C. and cooling temperatures ranging from 20 to 30° C. are especially suitable.

Although the invention has been described with reference to certain preferred embodiments, it is not the applicant's intention to be limited thereby, and certain obvious modifications of the composition, process and article of manufacture are intended to be included within the broad scope of the invention, as embodied in the following claims.

What is claimed is:

1. Method of packaging a shaped article which comprises forming a film of chlorinated polybutene-1 having a chlorine content of about 26 to 40 weight percent; elevating the temperature of said film; elongating said film; cooling said elongated film at said elevated temperature to about 20 to 30° C.; wrapping said article in said cooled film; and reheating said film about said shaped article to said elevated temperature whereby said film shrinks back to substantially its pre-elongated dimensions: provided, however, that such shrinkage is limited by the dimensions and configuration of said shaped article.

2. Process claimed in claim 1, wherein said film has a thickness of about .5 to 50 mils.

3. Process as claimed in claim 1, wherein said polybutene has a melt index of about 0.1 to 100.

4. Process as claimed in claim 1, wherein said elevated temperature elongation is about 300 to 400%.

5. Method as claimed in claim 1, wherein said elevated temperature is about 50 to 100° C.

6. Method as claimed in claim 1, wherein said butene-1 polymer is in foam form.

7. Method as claimed in claim 6, wherein chlorinated butene-1 polymer is admixed with at least one blowing agent selected from the group consisting of methylene chloride, acetone, methyl ethyl ketone; azobis-formamide; azobisisobutyronitrile; N,N' - dinitrosopentamethylenetetramine; benzene-1, 3-disulfonyl hydrazide; diphenylsulfone-3, 3'-disulfonyl hydrazide; 4,4'-oxybis (benzenesulfonyl hydrazide); N,N'-dimethyl - N,N' - dinitrosoterephthalamide, nitrogen; carbon dioxide, and inert gases prior to film formation, and wherein said film is foamed after formation.

References Cited

UNITED STATES PATENTS

| 2,913,449 | 11/1959 | Hoerger | 260—94.9 H |
| 2,964,509 | 12/1960 | Hart | 260—94.9 H |
| 3,093,526 | 6/1963 | Price | 264—230 X |
| 3,190,050 | 6/1965 | Kirkpatrick | 53—20 |
| 3,139,468 | 6/1964 | Wheat | 264—230 |
| 3,214,234 | 10/1965 | Bottomley | 264—54 UX |
| 3,255,877 | 6/1966 | Kracht | 264—321 UX |
| 3,297,819 | 1/1967 | Wetmore | 264—230 X |
| 3,400,810 | 9/1968 | Makowski | 264—321 X |
| 3,420,363 | 1/1969 | Blickensderfer | 264—230 X |
| 3,438,116 | 4/1969 | Stengle, Jr. | 264—342 |

JULIUS FROME, Primary Examiner

P. A. LEIPOLD, Assistant Examiner

U.S. Cl. X.R.

206—65 S; 260—94.9 H, 96 HA; 264—230, 292, 321, Dig. 71